(12) United States Patent
Hibbett et al.

(10) Patent No.: US 12,588,668 B1
(45) Date of Patent: Mar. 31, 2026

(54) FISHING WEIGHT

(71) Applicants: Mckenzie Hibbett, Rockledge, FL
(US); Sarah Harris, Melbourne, FL
(US)

(72) Inventors: Mckenzie Hibbett, Rockledge, FL
(US); Sarah Harris, Melbourne, FL
(US)

( * ) Notice: Subject to any disclaimer, the term of this
patent is extended or adjusted under 35
U.S.C. 154(b) by 0 days.

(21) Appl. No.: 18/951,913

(22) Filed: Nov. 19, 2024

(51) Int. Cl.
A01K 95/00 (2006.01)

(52) U.S. Cl.
CPC .................................. A01K 95/005 (2013.01)

(58) Field of Classification Search
CPC .................................................. A01K 95/005
See application file for complete search history.

(56) References Cited

U.S. PATENT DOCUMENTS

| 5,784,825 | A | * | 7/1998 | Ross | A01K 95/00 |
| | | | | | 43/43.12 |
| 6,851,217 | B1 | * | 2/2005 | Rayner | A01K 91/00 |
| | | | | | 43/43.12 |
| 2011/0214335 | A1 | * | 9/2011 | Song | A01K 95/00 |
| | | | | | 43/44.97 |
| 2015/0089860 | A1 | * | 4/2015 | Temple | A01K 95/00 |
| | | | | | 95/5 |
| 2020/0344990 | A1 | * | 11/2020 | Hansen | A01K 95/00 |
| | | | | | 95/5 |

* cited by examiner

*Primary Examiner* — Joshua J Michener
*Assistant Examiner* — Henry Hooper Mudd
(74) *Attorney, Agent, or Firm* — Widerman Malek, PL;
Mark Malek

(57) ABSTRACT

A fishing weight according to the present invention may
include a main body member having a passageway formed
through a medial portion thereof. The fishing weight may
also include an outer coating that covers a substantial
portion of an outer surface of the main body member. The
main body member may include a combination of calcium
chloride, magnesium glycinate, limestone, and water. The
outer coating may comprise a combination of gelatin, cal-
cium chloride and magnesium glycinate.

9 Claims, 1 Drawing Sheet

FISHING WEIGHT

FIELD OF THE INVENTION

The present invention relates to fishing weights and, more specifically, to fishing weights that are environmentally friendly and non-toxic.

BACKGROUND OF THE INVENTION

Fishing weights are also known in the art as sinkers. They have been used in the past to sink or lower bait and fishing hooks to greater depths while fishing. Many fish swim at lower depths and it is desirous to lower bait to where these fish are swimming in order to attract the fish.

The typical fishing weight or sinker is made of lead material. Prior art fishing weights are generally with an eyelet or passageway along some portion thereof. The prior art fishing weights are connected to fishing line using any type of knot that is tied in the fishing line. Lead weights are the typical choice of material of fishing weights due to the low cost and density. Due to the toxic nature of lead, there has been a movement away from the use of lead as the material for fishing weights. Materials that have been used in replacement of lead include steel, brass and bismuth, which is a transition metal that is lighter in weight. The issue with lead and other metal fishing weights is that it is common for fishing line to break, and the fishing weight to sink to the bottom of the body of water where the fishing activity is occurring. These fishing weights do not degrade and have become pollutants.

In many fishing bodies of water, the deposit of metal fishing weights as pollutants into the bodies of water over the course of years has had a negative impact on the ecosystems. In an effort to address the problem of metal weights being pollutants, sand has been used as an alternative. However, sand has a significantly lower density than lead and has proven to be a poor replacement. Another alternative has been to use tungsten as a replacement. This has been especially popular in the bass fishing industry. However, tungsten is much costlier and has proven to be unaffordable. Further, the environmental effects of tungsten are not yet known.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a fishing weight that is nontoxic, biodegradable, and environmentally friendly. The fishing weight according to embodiments of the present invention includes a main body member having a passageway formed through a medial portion thereof. The fishing weight according to the present invention may also include an outer coating that covers a substantial portion of an outer surface of the main body member. The main body member may comprise a combination of calcium chloride, magnesium glycinate, limestone, and water. The outer coating may comprise a combination of gelatin, calcium chloride and magnesium glycinate.

In some embodiments of the fishing weight according to the present invention, the main body member may comprise between 15% and 25% by weight of calcium chloride, between 10% and 25% by weight of magnesium glycinate, between 50% and 75% by weight of limestone, and the balance water.

The outer coating of the fishing weight may comprise between 30% and 75% by weight of gelatin. The outer coating may also comprise between 10% and 40% by weight of calcium chloride. The outer coating may further comprise between 10% and 40% by weight of magnesium glycinate.

The gelatin of the outer coating may be provided by bovine gelatin. Further, the limestone of the main body may be provided by oolite limestone. The passageway formed through the medial portion of the main body member may be sized to accept a fishing line therethrough. The main body may have at least one of an egg shape, a spherical shape, an ovular shape, and a cylindrical shape. The main body of the fishing weight may also comprise basalt, aragonite and sea clay. The outer coating may further comprise limestone.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
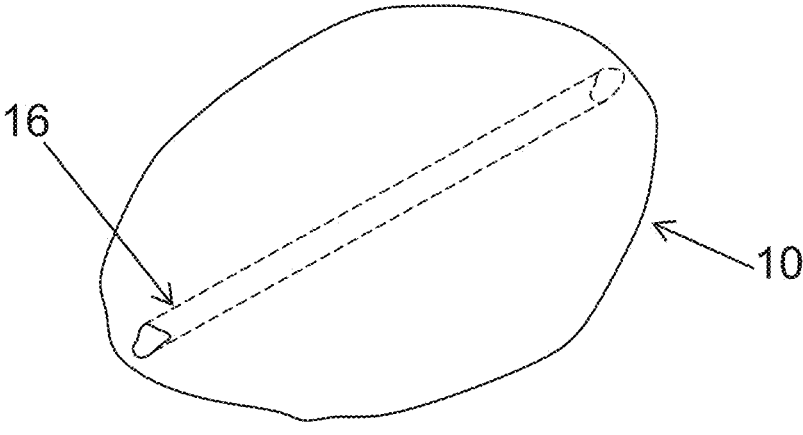
FIG. 1 is a plan view of a fishing weight according to an embodiment of the present invention.
Figure 2:
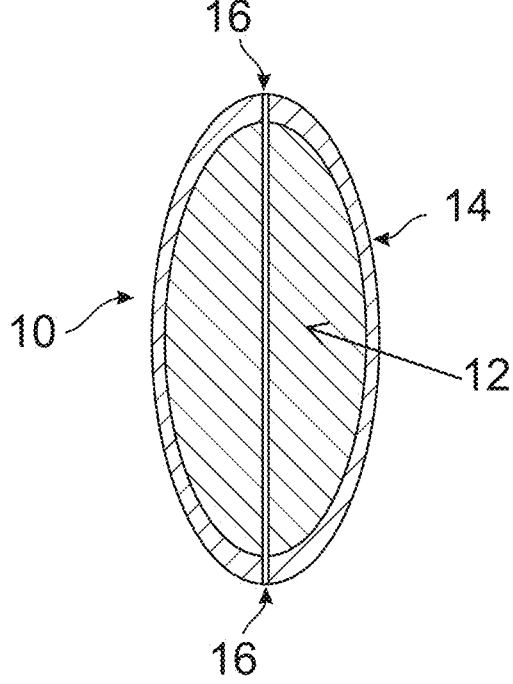
FIG. 2 is a sectional view of the fishing weight illustrated in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a fishing weight that provides an effective, environmentally friendly solution for anglers seeking to reduce their ecological footprint while maintaining high-performance characteristics in their fishing weights. The unique combination of materials for both the main body and the outer coating ensures durability, weight precision, and biodegradability, making it an innovative addition to the fishing industry.

Some of the illustrative aspects of the present invention may be advantageous in solving the problems herein described and other problems not discussed which are discoverable by a skilled artisan.

The fishing weight 10 according to embodiments of the present invention may include A main body member 12 and an outer coating 14 position to cover the main body member 12. A passageway 16 may be formed through a medial portion of the main body member 12. The main body 12 member of the fishing weight 10 may comprises a mixture of calcium chloride, magnesium glycinate, limestone, and water. This combination provides a solid yet environmentally friendly material that can sink to the desired depth in the water while also offering the potential for biodegradability over time. Further, this combination of materials provides a desired density that is advantageous to anglers when casting and engaging in other fishing activities.

The main body member 12 preferably comprises between about 15% and 25% by weight of calcium chloride, between about 10% and 25% by weight of magnesium glycinate, between about 50% and 75% by weight of limestone, and the balance being water. The limestone may be selected from different types of natural stone, with oolite limestone being a particularly preferred embodiment. Oolite limestone is chosen for its ability to provide the required weight while also being a natural, eco-friendly material. Those skilled in the art will appreciate that any other type of limestone is suitable for carrying out the advantages, features, and benefits of the present invention.

The outer coating 14 of the fishing weight 10 covers a substantial portion of the main body 12, providing additional durability and protection against abrasion. This is especially important when the fishing weight 10 according to the present invention is used in saltwater or brackish environments. The outer coating 14 may comprise a combination of gelatin, calcium chloride, and magnesium glycinate. More specifically, the outer coating preferably comprises between 30% and 75% by weight of gelatin, between 10% and 40% by weight of calcium chloride, and between 10% and 40% by weight of magnesium glycinate. In a preferred embodiment, the gelatin is bovine gelatin, a material that is advantageously known for its strength, flexibility, and biodegradability properties. Those skilled in the art Will appreciate that any type of gelatin may be used to carry out the advantages, features and benefits of the present invention.

The main body member 12 of the fishing weight 10 according to embodiments of the present invention may include a passageway 16 formed through a medial portion thereof. This passageway 16 is sized to accept a fishing line therethrough, allowing the fishing weight 10 to be easily attached to a fishing line or rig. The passageway may be cylindrical, rectangular, or any other shape suitable for accepting a fishing line.

The main body member 12 of the fishing weight may be shaped in one or more forms, such as, for example, an egg shape, a spherical shape, an ovular shape, or a cylindrical shape, depending on the design requirements and intended use of the fishing weight.

In addition to the primary components of calcium chloride, magnesium glycinate, limestone, and water, the main body 12 may optionally include other minerals or compounds to enhance the physical properties of the fishing weight 10. These may include, for example, basalt, which is a dense volcanic rock that may be added to increase the overall density of the fishing weight. The percentage by weight of the basalt may vary depending on the intended use of the fishing weight 10 according to the present invention. For example, basalt may be included in an amount of between about 10% and 50% by weight, if so desired.

Further, aragonite may also be included as a material of the main body 12 of the fishing weight 10 according to embodiments of the present invention. Aragonite is a naturally occurring mineral form of calcium carbonate that may be incorporated to advantageously enhance the stability and durability of the fishing weight. The percentage by weight of the aragonite may vary depending on the intended use of the fishing weight 10 according to the present invention. For example, aragonite may be included in an amount of between about 10% and 60% by weight, if so desired, and depending on the end use of the fishing weight 10, as well as the type of water that the fishing weight 10 will be used in.

The main body 12 of the fishing weight 10 may also include sea clay. Sea clay is a natural material that may contribute to the eco-friendly properties of the fishing weight 10 according to the present invention. Sea clay may advantageously provide additional binding agent for the composition of the main body 12. The percentage by weight of the sea clay may vary depending on the intended use of the fishing weight 10 according to the present invention. For example, sea clay may be included in an amount of between about 5% and 25% by weight, if so desired.

The environmental benefits of the fishing weight 10 according to the present invention are tremendous. For example, one key advantage of the fishing weight 10 according to the present invention is its environmentally friendly composition. The materials used, including limestone, magnesium glycinate, and gelatin, are less toxic to aquatic life compared to traditional lead-based fishing weights. The outer coating, particularly the gelatin, is biodegradable and may break down over time, reducing the risk of environmental pollution.

The fishing weight 10 of the present invention offers several significant advantages, including eco-friendly composition. The use of biodegradable materials reduces the environmental impact, particularly in aquatic ecosystems. The fishing weight 10 according to the present invention is also customizable in weight and durability. The combination of limestone, calcium chloride, and magnesium glycinate in the main body member 12 allows for precise control over the weight, while the outer gelatin coating provides protection and durability. The materials selected for both the main body member 12 and the outer coating 14 are also advantageously cost effective.

The fishing weight 10 according to the present invention also provides enhanced stability. The density and weight distribution of the materials of the main body member 12 and the outer coating 14 ensure that the fishing weight 10 performs effectively under various conditions, including saltwater and freshwater environments.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A fishing weight comprising:
a main body member having a passageway formed through a medial portion thereof; and
an outer coating that covers a substantial portion of an outer surface of the main body member;
wherein the main body comprises:
between 15% and 25% by weight of calcium chloride;
between 10% and 25% by weight of magnesium glycinate;
between 60% and 75% by weight of limestone; and
wherein the outer coating comprises:
between 30% and 75% by weight of gelatin;
between 10% and 40% by weight of calcium chloride; and
between 10% and 40% by weight of magnesium glycinate.

2. The fishing weight according to claim 1 wherein the gelatin is bovine gelatin.

3. The fishing weight according to claim 1 wherein the limestone is oolite limestone.

4. The fishing weight according to claim 1 wherein the passageway formed through the medial portion of the main body member is sized to accept a fishing line therethrough.

5. The fishing weight according to claim 1 wherein the main body has at least one of an egg shape, a spherical shape, an ovular shape, and a cylindrical shape.

6. The fishing weight according to claim 1 wherein the main body further comprises basalt.

7. The fishing weight according to claim 1 wherein the main body further comprises aragonite.

8. The fishing weight according to claim 1 wherein the main body further comprises sea clay.

9. The fishing weight according to claim 1 wherein the outer coating further comprises limestone.

* * * * *